(12) United States Patent
Wang et al.

(10) Patent No.: US 10,531,177 B2
(45) Date of Patent: Jan. 7, 2020

(54) EAR CUP WITH ATTACHMENT UNIT

(71) Applicant: Sennheiser Communications A/S, Ballerup (DK)

(72) Inventors: Christian Wang, Ballerup (DK); Peter Vestergaard Værum, Ballerup (DK); Henrik Roed, Ballerup (DK); Torben Kristensen, Ballerup (DK); Hennadiy Petrov, Lviv (UA); Brian Spidsbjerg, Ballerup (DK)

(73) Assignee: SENNHEISER COMMUNICATIONS A/S, Ballerup (DK)

( * ) Notice: Subject to any disclaimer, the term of this patent is extended or adjusted under 35 U.S.C. 154(b) by 93 days.

(21) Appl. No.: 15/707,437

(22) Filed: Sep. 18, 2017

(65) Prior Publication Data

US 2018/0084330 A1    Mar. 22, 2018

(30) Foreign Application Priority Data

Sep. 19, 2016  (EP) .................................... 16189453

(51) Int. Cl.
   *H04R 1/10*        (2006.01)
   *H04R 5/033*       (2006.01)

(52) U.S. Cl.
   CPC ......... *H04R 1/1075* (2013.01); *H04R 1/1066* (2013.01); *H04R 5/0335* (2013.01); *H04R 1/1008* (2013.01)

(58) Field of Classification Search
   CPC ...... H04R 1/10; H04R 1/1075; H04R 1/1008; H04R 1/1033; H04R 1/1066; H04R 5/033; H04R 5/0335; H04R 2420/07; H04R 2420/09; H02J 7/00

USPC .......................... 381/378, 371, 384, 74, 370
See application file for complete search history.

(56) References Cited

U.S. PATENT DOCUMENTS

| 4,499,593 A | 2/1985 | Antle |
| 7,457,649 B1* | 11/2008 | Wilson ................. H04R 1/1025 379/428.02 |
| 2008/0180874 A1* | 7/2008 | Gauger ................. H02J 7/0055 361/235 |
| 2012/0039481 A1 | 2/2012 | McClain |
| 2012/0099754 A1 | 4/2012 | Petersén |

(Continued)

FOREIGN PATENT DOCUMENTS

WO  WO 2009/105795 A1   9/2009

*Primary Examiner* — Ahmad F. Matar
*Assistant Examiner* — Sabrina Diaz
(74) *Attorney, Agent, or Firm* — Birch, Stewart, Kolasch & Birch, LLP

(57) ABSTRACT

The invention relates to an ear cup with an attachment unit, which is configured to be used within a head-worn hearing device. The attachment unit comprises at least one connection section, which is arranged and configured to rotatable connect the attachment unit with the ear cup and thereby define an axis of rotation of the ear cup. The attachment unit further comprises an opening, which is arranged to allow a charge interface of the ear cup, which extends out of an ear cup casing of the ear cup, to pivot through the attachment unit while the ear cup is being rotated with respect to the attachment unit along the axis of rotation, wherein the charge interface is directed to the attachment unit and is placed at a side portion of the ear cup between a hearing portion of the ear cup, facing to an ear of a user, and a back portion of the ear cup, facing away from the user.

20 Claims, 7 Drawing Sheets

(56) References Cited

U.S. PATENT DOCUMENTS

2014/0079257 A1\* 3/2014 Ruwe .................... F21V 21/084
   381/309
2015/0131839 A1 5/2015 Blonder et al.
2015/0222980 A1 8/2015 Pizzaro et al.

\* cited by examiner

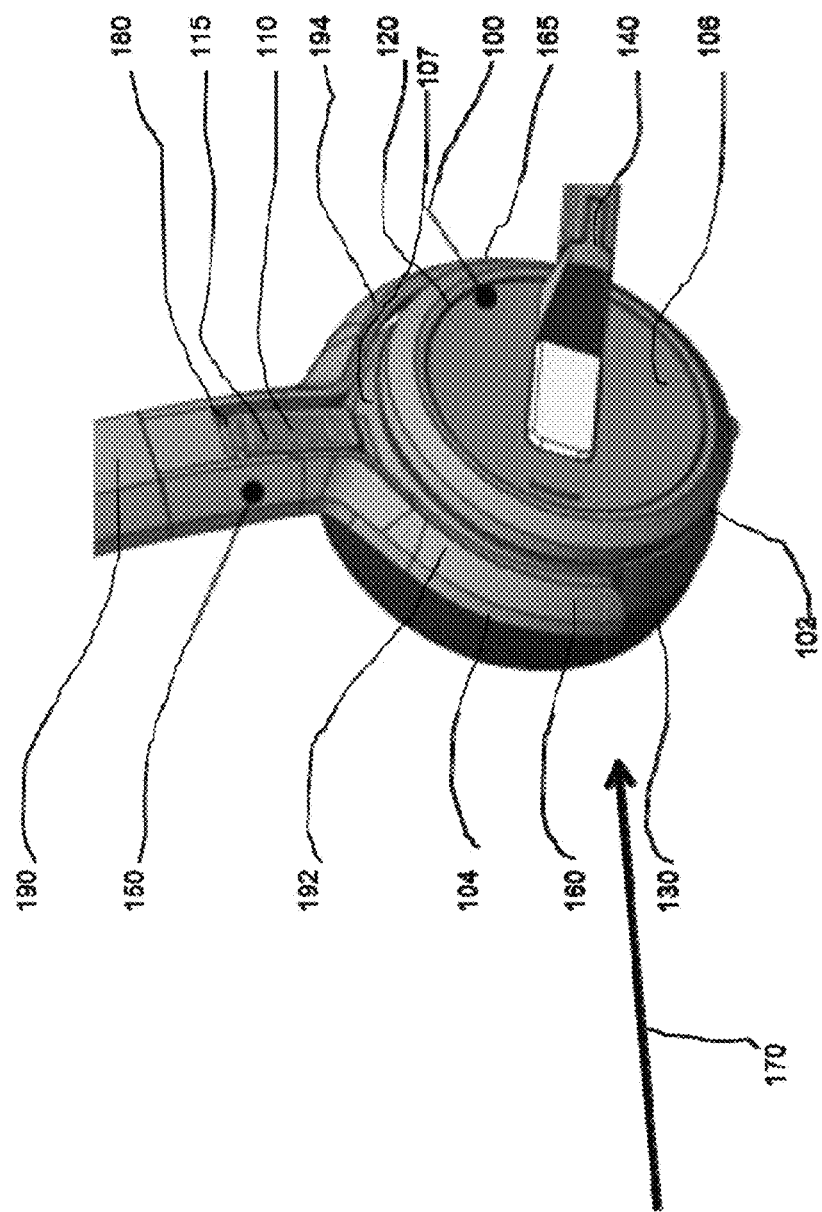

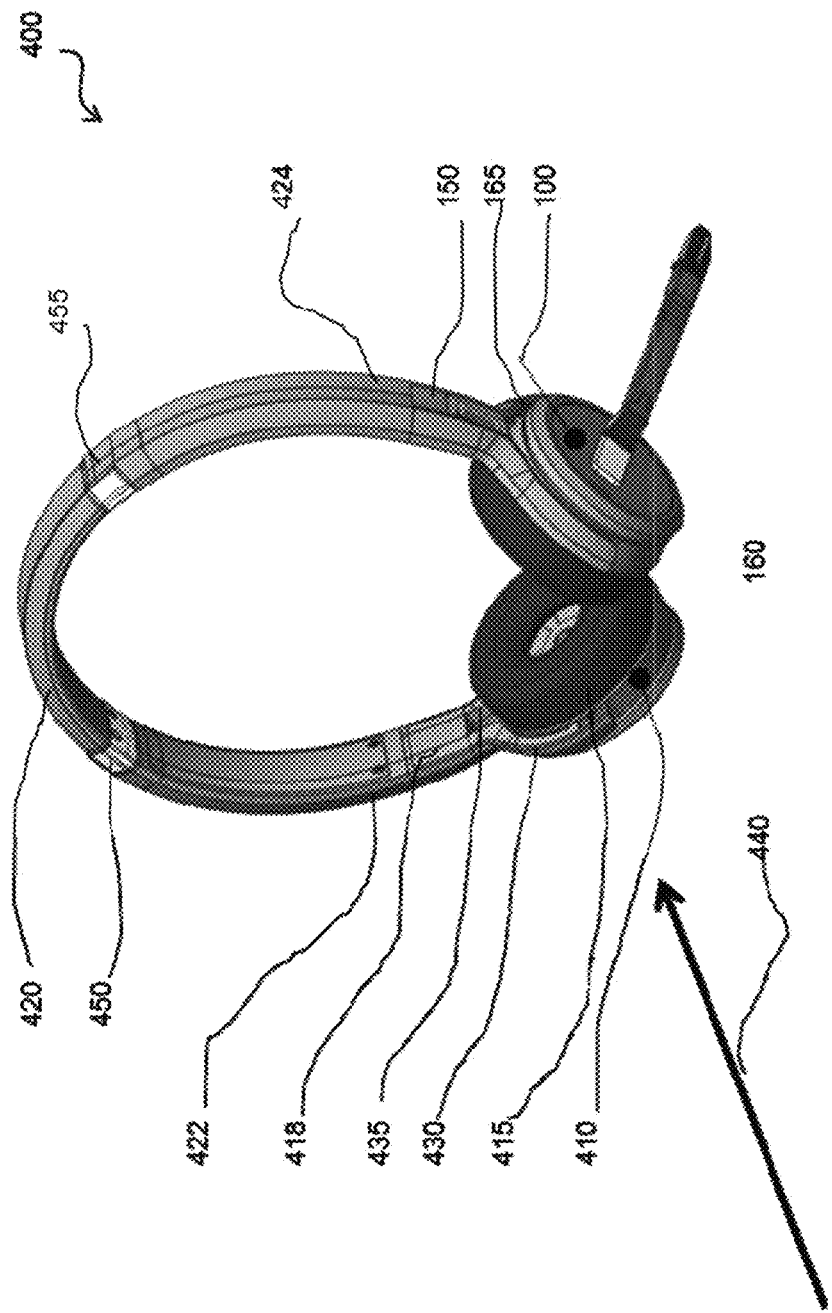

EAR CUP WITH ATTACHMENT UNIT

TECHNICAL FIELD

The invention relates to an ear cup with an attachment unit, configured to be used within a head-worn device. The invention further relates to a wireless hearing device and to a hearing system.

BACKGROUND

Hearing devices with acoustic earpad sealing are known, which ensure acoustical sealing between speaker in the hearing device and the user's ear by rotating ear cups of the hearing device. The ear cups are typically rotatable attached to a head part of the hearing device via an attachment unit. Thereby, the position of the ear cups can be adapted to a respective shape of the user's head.

For further reducing the space required to transport the hearing device, a slim industrial design is desired.

US 2015/0222980 A1 describes a headset having rotatable ear cups. The described headset includes a headband having a first end and a second end. An earphone unit is coupled to each end of the headband. The earphone unit includes an ear cup that is rotatable between a closed position and an open position.

WO 2009/105795 A1 describes a headphone having an articulated connecting mechanism between earpieces and the headband, wherein the connecting mechanism comprises at least three rotary joints, having a band axis, which in the end region of the headband is provided to extend in the direction thereof, an intermediate axis, and an earpiece axis, and a pivot arm that can be pivoted about the headband axis and carries the intermediate axis.

SUMMARY

It is the object of the invention to provide an improved ear cup with an improved attachment unit for being used within a head-worn hearing device.

A further object of the invention is to provide an improved adjustment of the ear cup to the head of a user while having a charge element protruding the ear cup. This may be provided by allowing the user to rotate the ear cup so that an optimized fitting between the ear cup and the head of the user is obtained.

An even further object of the invention is to provide a rotatable microphone arm which position is independent on the position of the charge element relative to a base station.

According to a first aspect, the invention relates to an ear cup with an attachment unit, which is configured to be used within a head-worn hearing device. The attachment unit comprises at least one connection section, which is arranged and configured to rotatable connect the attachment unit with the ear cup. The connection section comprises a first part rigidly fixed at the ear cup and a second part rigidly fixed at an attachment body of the attachment unit. The first and the second part are rotatable attached to each other and thereby define an axis of rotation of the ear cup with respect to the attachment unit.

The attachment unit further comprises an opening, which is arranged to allow a charge element of the ear cup, which extends out of an ear cup casing of the ear cup, to pass through the opening of the attachment unit while the ear cup pivots with respect to the attachment unit along the axis of rotation. The charge element extends from the periphery of the ear cup in the direction of the attachment unit and is placed at a side portion of the ear cup between a hearing portion of the ear cup, facing to an ear of a user in case of use, and a back portion of the ear cup, facing away from the user in case of use. The charge element according to the present invention is electrically connected to an ear cup circuitry within the ear cup, which is configured to operate a speaker unit of the ear cup.

The charge element may be a charge interface, or the charge interface may be the charge element. The charge element is not a battery or a condenser.

The attachment unit further comprises an opening, which is arranged to allow a charge element of the ear cup, which extends out of the ear cup, to pass through the opening of the attachment unit while the ear cup pivots with respect to the attachment unit along the axis of rotation. The charge element extends from the periphery of the ear cup in the direction of the attachment unit and is placed at a side portion of the ear cup between a hearing portion of the ear cup, facing to an ear of a user in case of use, and a back portion of the ear cup, facing away from the user in case of use. The charge element according to the present invention is electrically connected to an ear cup circuitry within the ear cup, which is configured to operate a speaker unit of the ear cup.

The charge element may be arranged such that a microphone arm mounted on the ear cup can freely rotate without rotating the charge element. The ear cup casing comprises an inner ring portion where the charge element is mounted and a rotatable back portion where the microphone arm is mounted. While rotating the microphone arm the attachment unit is fixed to a given portion. Thereby, the user is able to keep the optimal position of the microphone arm, according to the mouth of the user, while inserting the charge element into a base station.

The charge element may be a charge interface which for example comprises one or more charge pins configured to be inserted into a charge plug interface or positioned on a charge plate.

The ear cup with the attachment unit according to the invention advantageously allows a sealing of the ear cup at a user's ear by rotating the cup with respect to the attachment unit. The sealing improves the hearing comfort, since a perception of environmental noise and the sound exposure of the environment are reduced. In particular, the charge element does not reduce the possible angle of rotation, since it pivots through the attachment unit while the ear cup is being rotated with respect to the attachment unit along the axis of rotation. As a consequence, the ear cup can be better adapted to the user's head, providing an overall comfortable wearing style.

In case of use, the charge element is furthermore advantageously protected by the surrounding attachment unit, since it extends out of the ear cup casing into the opening of the attachment unit. The attachment units part surrounding the opening thus forms a protective frame for the charge element. The inventive attachment unit thus supports a robustness of a hearing device equipped with the ear cup and with the attachment unit.

The opening may be formed into the attachment unit or by the attachment unit. Alternatively, the opening may be formed between the first part and the second part.

Using a charge element that protrudes out of the ear cup casing can be particularly advantageous for providing a proper connection between the ear cup with the charge element and a charge station for the respective hearing device. Such a protruding charge element particularly allows a hanging of the ear cup in the charge station, since the protruding part of the charge element can be hold in a respective socket of the charge station.

The ear cup with the attachment unit advantageously combines the acoustical sealing, i.e. an improved hearing comfort, with the use of an extended charge element, which can support the robustness and reliability of a respectively formed hearing device and/or of a respective electric connection with a charge station.

With the ear cup circuitry within the ear cup, further units might also be operated, such as a microphone unit or a processor unit of the ear cup.

The ear cup with the attachment unit preferably comprises physical connection means for mounting the attachment unit to a further part for forming a respective hearing device.

The opening can be advantageously formed according to the dimensions of the charge element, thus allowing the charge element to pivot through the attachment unit.

The attachment body of the attachment unit forms a rigid framework of the attachment unit. That is why the attachment body is used to rigidly fix the second part of the connection section at the attachment unit.

In the following, embodiments of the ear cup with the attachment unit according to the first aspect will be described.

The connection section and/or the further connection section are preferably placed at the side portion of the cup. Thereby, the axis of rotation passes through the side portion of the ear cup. Furthermore, attaching the connection section not at the back portion of the ear cup, allows the ear cup to have a small width.

In a preferred embodiment, the attachment unit comprises a further connection section, which is arranged and configured to rotatable connect the attachment unit with the ear cup and thereby allows a rotation of the ear cup with respect to the attachment unit along the axis of rotation. The further connection section improves the robustness of the respective attachment between attachment unit and ear cup. The connection section and the further connection of this embodiment are arranged at a respective one of the two points of side portion of the ear cup, where the axis of rotation passes through the ear cup.

In a further embodiment, the connection section and/or the further connection section further comprise a guiding part, arranged to guide a number of connection wires from the ear cup to the attachment unit in order to electrically connect the ear cup with a second ear cup via the attachment unit. Using a guiding part for guiding a number of connection wires is particularly advantages, since exposed wires might get entangled into hair of the user or got stuck or caught on outside objects. Thus, the guiding part decreases the risk of breaking the connection wires and improves a wearing comfort at the same time. Using the further connection section together with the connection section with a guiding part for guiding respective connection wires can reduce a rotational friction directed against the direction of rotation, due to the number of connection wires. Two thin bundles of connection wires lead to a smaller rotational friction than a single thick bundle of connection wires.

In a variant of the previous embodiment, the connection wires are enclosed or capsulated by the guiding part. Thereby, the risk of breaking the connection wires is further reduced. Furthermore, the connection wires of this variant are protected against environmental influences such as humidity or heat.

In a preferred embodiment, the ear cup further comprises a rechargeable battery, which is electrically connected to the ear cup circuitry. The rechargeable battery allows the respective hearing device that comprises the ear cup, to be operated wirelessly. In a preferred variant of this embodiment, the charge element comprises charge pins or a charge stick configured to be arranged at a charge station in order to charge the rechargeable battery. In this embodiment, the respective hearing device is a wireless hearing device, which is charged by placing the charge element at the charge station. Providing the rechargeable battery in the ear cup allows a large amount of space that can be filled by the rechargeable battery, since the commonly used industrial design combines large ear cups with a rather small headband or neckband.

In a further embodiment of the invention, the charge element extends from the side portion of the ear cup in a direction essentially perpendicular to the axis of rotation. In this embodiment, the opening is spaced away from the connection section and possibly from the further connection section as far as possible. The charge element of this embodiment moves perpendicularly to the axis of rotation throughout the pivoting motion. Thereby a smooth passing through the opening of the attachment unit can be secured.

In one embodiment the attachment unit comprises a L-type form, a J-type form or a Y-type form. The J-type form and the Y-type form comprise the connection section and the further connection section, whereas the attachment unit of the L-type form just comprises the connection section. These well-known forms allow a particularly attractive wearing style, which is adapted according to the common slim industrial design.

In a further embodiment, the ear cup is oval-shaped, ear-shaped or circular-shaped. These well-known ear cup shapes allow a particularly effective sealing of the ear cup at the user's ear. The size of the ear cup is preferably chosen to allow the ear cup to completely surround the user's ear. This embodiment is particularly advantageous for the inventive ear cup, since the freely pivotable ear cup allows a sealing of the user's ear. In a preferred variant of this embodiment, the ear cup further comprises an earpad, made of a soft material. The earpad further improves the wearing comfort of a user of the inventive ear cup with the attachment unit.

According to a second aspect, the invention relates to a wireless hearing device, configured to be worn by a head of a user, comprising an embodiment of the ear cup with the attachment unit according to the first aspect of the invention, a counterpart and a head part.

The counterpart is arranged to be attached at a side of the head of the user that is opposed to the ear where the ear cup is worn.

The head part is configured to have a first end attached to the attachment unit and to have a second end attached to the counterpart, such that the hearing device is clamped between the ear cup and the counterpart.

By clamping the inventive hearing device between the ear cup and the counterpart, the hearing device can be mounted at the head of a hearing device user.

The head part of the hearing device is preferably a headband or a neckband.

In a preferred embodiment, the counterpart of the hearing device is formed by a second ear cup, and wherein the connection section further comprises a guiding part, arranged to guide a number of connection wires from the ear cup to the attachment unit in order to electrically connect the ear cup with the second ear cup via the attachment unit. Preferably, the ear cup further comprises a rechargeable battery, which is connected to the second ear cup via the number of connection wires. In a further variant of this embodiment, a further connection section is arranged at the ear cup to rotatable connect the attachment unit with the ear cup. The further connection section comprises in a respective further variant a further guiding part to guide a number of connection wires from the ear cup to the attachment unit. In this embodiment, the head part is configured to guide the connection wires from the ear cup to the second ear cup.

In an alternative embodiment, the counterpart is formed by a rigid end of the head part, which is pressed against the user's head in case of use, to hold the ear cup at the user's ear. In this embodiment, the circuitry of the hearing device is solely arranged in the ear cup.

In a further embodiment, the second ear cup is attached to the head part via a second attachment unit, which comprises at least one second connection section. The second connection unit is arranged and configured to rotatable connect the second attachment unit with the second ear cup. The second connection unit comprises a further first part rigidly fixed at the second ear cup and a further second part rigidly fixed at a second attachment body of the second attachment unit. The further first and the further second part are rotatable attached to each other and thereby define a second axis of rotation of the second ear cup with respect to the second attachment unit. In a preferred variant of this embodiment, the second connection section comprises a second guiding part, arranged to guide a number of connection wires from the second attachment unit to the second ear cup. This allows the hearing device to avoid an external contact with the connection wires of the hearing device. Thus, the hearing device according to this variant reduces the risk of broken wires or of an entanglement of hair.

The wireless hearing device according to the second aspect of the invention is preferably a headset, in particular a single-ear headset, a headphone or an ear protection device.

According to a third aspect, the invention relates to a hearing system comprising the hearing device according to the second aspect of the invention and a charge station, which is configured to charge the hearing device via the charge element.

The charge element preferably comprises a complement part providing a good electric contact between the charge station and the charge element. Preferably, the charge element comprises charge pins or a charge stick and the complement part holds the protruding charge element and provides an electric contact with the charge element. The charge station is configured to receive a line voltage and to convert this electric supply to a voltage that can be used by the hearing device.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

FIGS. 1a and 1b, show a first embodiment of an ear cup with an attachment unit according to the first aspect of the invention in an unrotated state of the ear cup (FIG. 1a) and in a rotated state of the ear cup with respect to the attachment unit (FIG. 1b), FIG. 4, shows an embodiment of a wireless hearing device according to the second aspect of the invention.

DETAILED DESCRIPTION

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In general, a hearing device includes i) an input unit such as a microphone for receiving an acoustic signal from a user's surroundings and/or the user's own voice and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

Figure 1B:
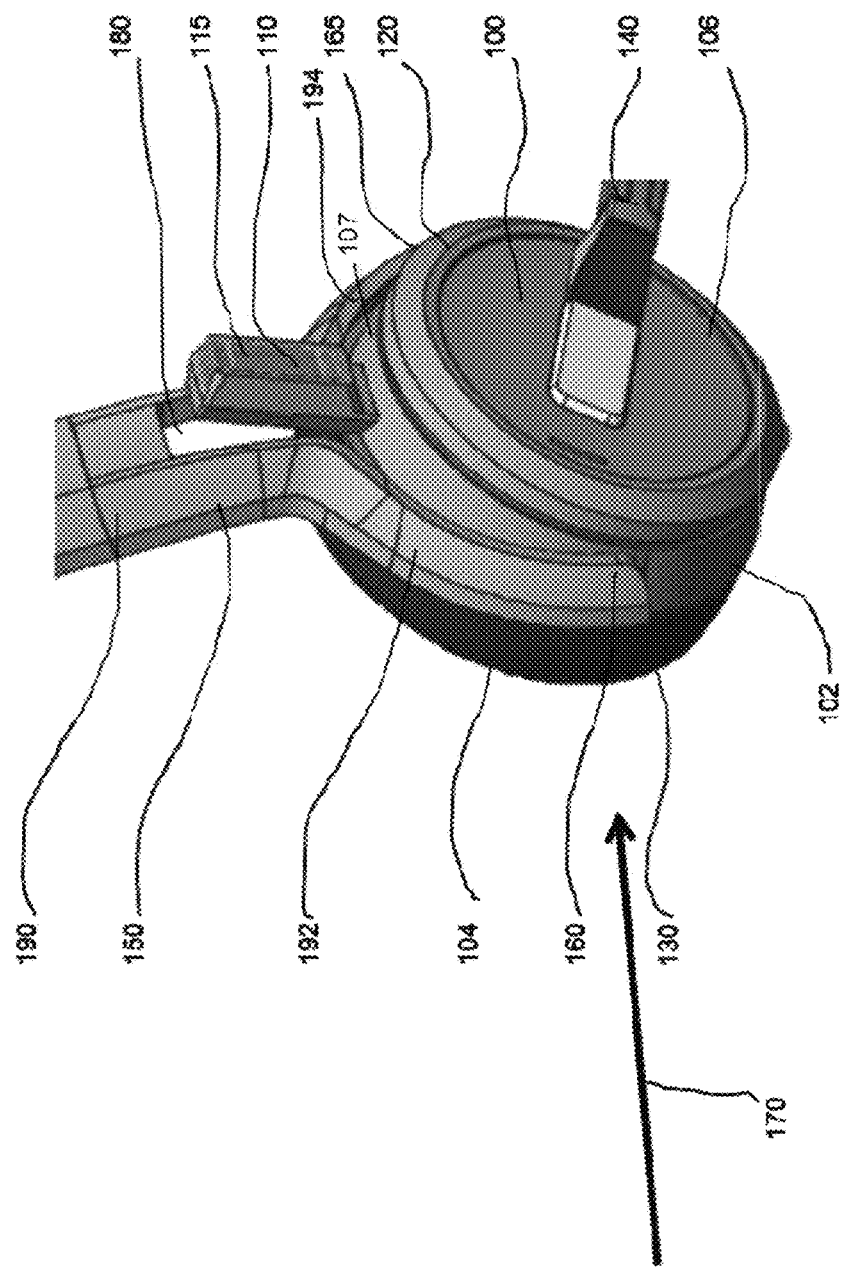

Now referring to FIGS. 1a and 1b, which illustrate a first embodiment of an ear cup 100 with an attachment unit 150 in an unrotated state of the ear cup 100 (FIG. 1a) and in a rotated state of the ear cup 100 with respect to the attachment unit 150 (FIG. 1b).

The ear cup 100 is configured to be used within a head-worn hearing device, as illustrated in FIG. 4. The ear cup comprises a charge element 110, which protrudes out of an ear cup casing 120 of the ear cup 100. The ear cup 100 further comprises a side portion 102 between a hearing portion 104 of the ear cup 100, facing to an ear of a user in case of use, and a back portion 106 of the ear cup 100, facing away from the user in case of use. The ear cup 100 of the illustrated embodiment is circularly shaped and comprises an earpad 130 at the hearing portion 104 of the ear cup 100. At the back portion 106 of the ear cup 100 a microphone boom 140 is arranged, which comprises a microphone, which is thereby rotatable arranged at the back portion 106 in order to allow an appropriate distance between the microphone and a mouth of the user.

The charge element 110 comprises charge pins 115, configured to be arranged at a charge station in order to charge a rechargeable battery of the ear cup 100 (not shown for reasons of clarity). The charge element 110 according to the present invention is electrically connected to an ear cup circuitry within the ear cup 100, which is configured to operate a speaker unit of the ear cup 100. The charge element 110 may be mounted on an inner ring portion 107 of the ear pad casing.

The attachment unit 150 comprises a connection section 160 and a further connection section 165, which are arranged and configured to rotatable connect the attachment unit 150 to the ear cup 100 by means of a first part rigidly fixed at the ear cup 100 and a second part rigidly fixed at an attachment body of the attachment unit 150. The first and the second part are rotatable attached to each other and thereby define an axis of rotation 170 of the ear cup 100 with respect to the attachment unit 150. The first and second par are not illustrated for reasons of clarity, but respective connection sections are well-known in the field of hearing devices.

The attachment unit 150 further comprises an opening, 180, which is arranged to allow the charge element 110 of the ear cup 100 to pass through the attachment unit 150 while the ear cup 100 pivots with respect to the attachment unit 150 along the axis of rotation 170, wherein the charge element 110 is directed to the attachment unit 150 and is placed at the side portion 102.

The connection section 160 and the further connection section 165 are placed at those places of the side portion, where the axis of rotation 170 passes through the side portion 102 of the ear cup casing 120. Thereby both connection sections 160, 165 secure the ear cup 100 at the attachment unit 150 and therefore support a robustness of the shown embodiment.

In the illustrated embodiment, the attachment unit 150 has a Y-type form. The "Y" is formed by a headband 190, while two bows 192, 194, which end at the respective connection section 160, 165, form the further part of the "Y". The bows 192, 194 are formed such that a rotation of the ear cup 100 with respect to the attachment unit 150 is possible. In another embodiment, the attachment unit has a L-type form or a J-type form, as illustrate in FIGS. 3a and 3b.

In the unrotated state as shown in FIG. 1a the ear cup 100 is in a position, wherein the attachment unit 150 provides a lateral protection against shear forces. Depending on the individual user's ear shape, the depicted unrotated state does usually not provide a sealing of the user's ears.

FIG. 1b on the other hand illustrates more clearly the opening 180, through which the charge element 110 passes, when the ear cup 100 is rotated with respect to the attachment unit 150 along the axis of rotation 170.

The rotated state of the ear cup 100 allows the ear cup 100 with the earpad 130 to seal the user's ear in case of use.

The charge element 110 extends from the side portion 102 of the ear cup 100 in a direction essentially perpendicular to the axis of rotation 170.

Figure 2A:
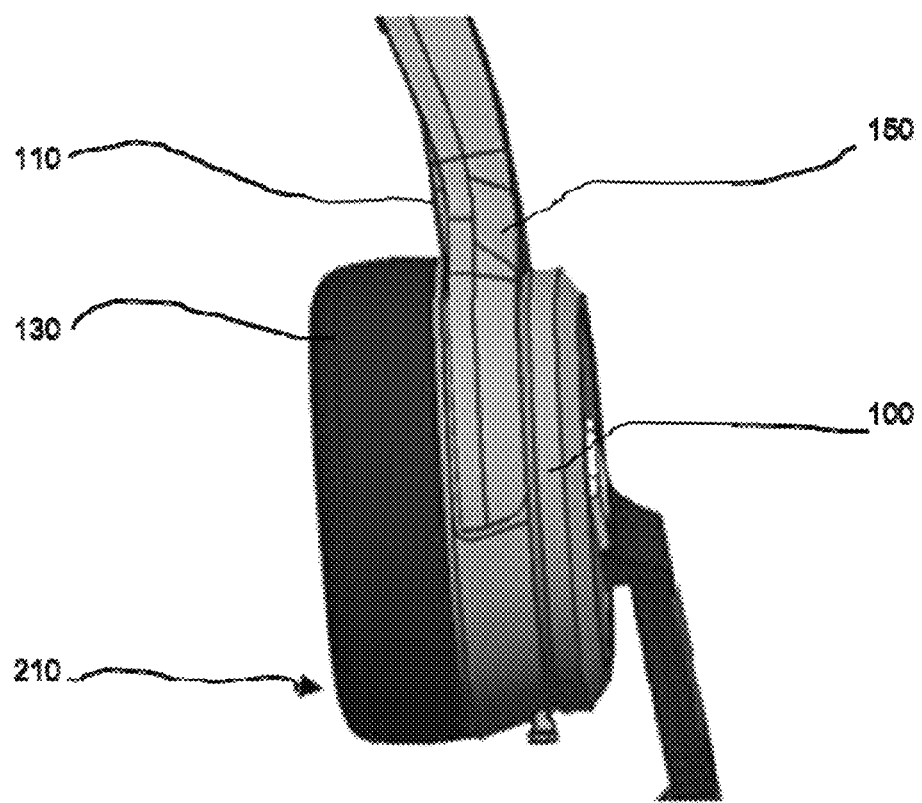
FIGS. 2a and 2b, show a side view of the first embodiment of the ear cup with the attachment unit in the unrotated state of the ear cup (FIG. 2a) and in the rotated state of the ear cup with respect to the attachment unit (FIG. 1b)
Figure 2B:
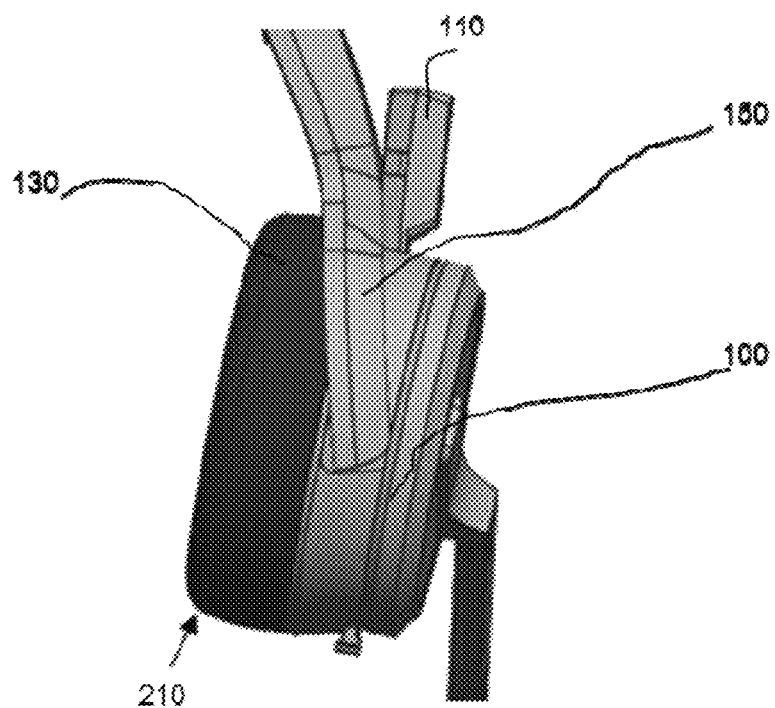

FIGS. 2a and 2b illustrate a side view of the first embodiment of the ear cup 100 with the attachment unit 150 in the unrotated state of the ear cup 100 (FIG. 2a) and in the rotated state of the ear cup 100 with respect to the attachment unit 150 (FIG. 2b).

By comparing FIGS. 2a and 2b, it can be recognized that a lower portion 210 of the ear cup 100 with the respective earpad 130 can be tilted by rotating the ear cup 100 with respect to the attachment unit 150. Thereby, a sealing of an ear of the user is facilitated.

Furthermore, FIGS. 2a and 2b illustrate that the charge element 110 can swing freely through the attachment unit 150 while rotating the ear cup 100 along the axis of rotation (perpendicular to the image plane).

Figure 3A:
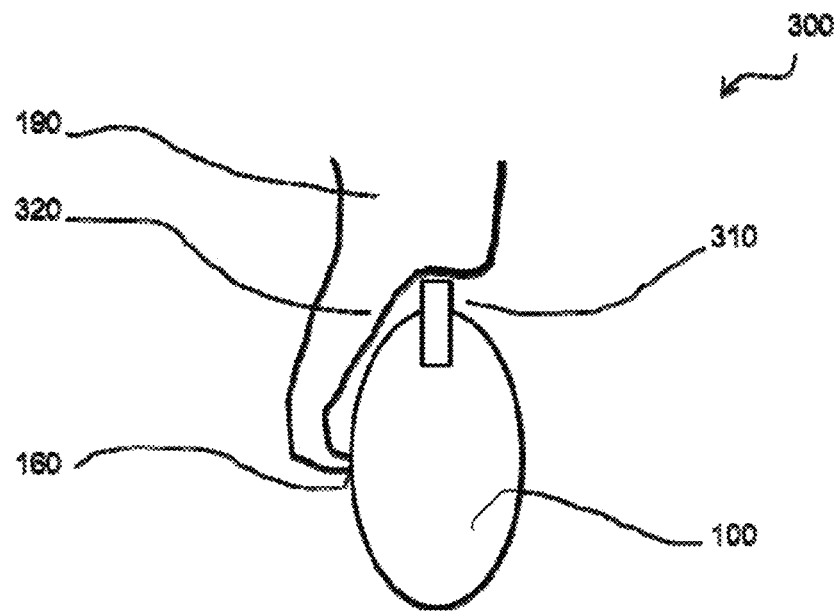
FIGS. 3A and 3B, show a second embodiment with a L-type form attachment unit (FIG. 3a) and a third embodiment with a J-type form attachment unit (FIG. 3b) according to the first aspect of the invention.
Figure 3B:
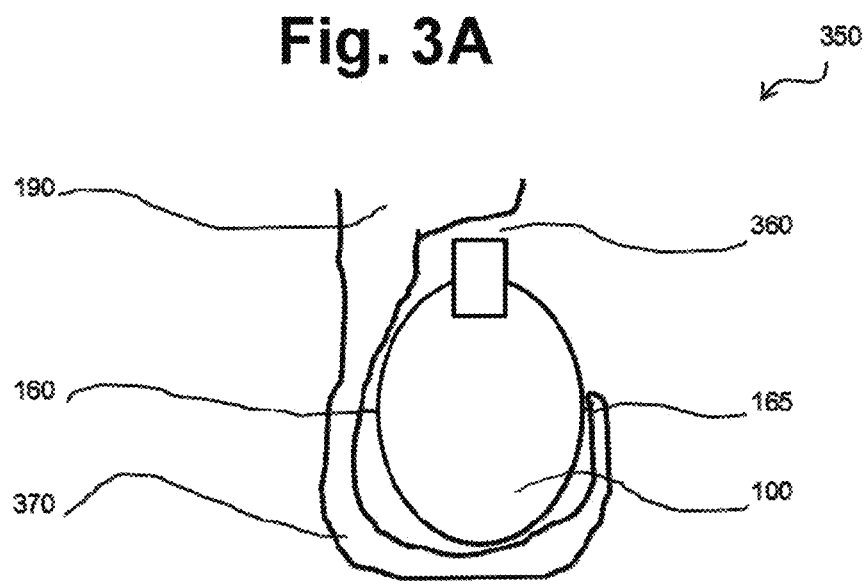

FIGS. 3a and 3b illustrate a second embodiment with a L-type form attachment unit 300 (FIG. 3a) and a third embodiment with a J-type form attachment unit 350 (FIG. 3b) according to the first aspect of the invention.

The attachment unit 300 and the attachment unit 350 are structurally identical to the attachment unit 150 shown in FIGS. 1a, 1b, 2a, 2b with the only difference, that the attachment unit comprises a different form. Furthermore, the L-shaped attachment unit 300 comprises just one connection section 160.

The openings 310 and 360 of the attachment units 300 and 350 are adapted to the respective form of the bows 320 and 370 that connect the respective ear cup 100 with the headband 190.

The attachment units 150, 300 and 350 all allow a slim industrial design of the hearing device comprising the respective attachment unit.

FIG. 4 illustrates an embodiment of a wireless hearing device 400.

The wireless hearing device 400 is configured to be worn at a head of a user. It comprises the ear cup 100 and the attachment unit 150 according to the first embodiment shown in FIGS. 1a, 1b, 2a, 2b, a counterpart 410 and a head part 420.

The counterpart 410 is formed by a second ear cup 415 with a second attachment unit 418 arranged to be attached at the second ear of the user that is opposed to the ear where the ear cup 100 is worn.

The connection section 160 and the further connection section 165 comprise a respective guiding part, arranged to guide a number of connection wires from the ear cup 100 to the attachment unit 150 in order to electrically connect the ear cup 100 with the second ear cup 415 via the attachment unit 150.

Furthermore, the second ear cup 415 is attached to the head part 420 via the second attachment unit 418, which comprises a second connection section 430 and a second further connection section 435. The second attachment unit 418 is arranged and configured to rotatable connect the second attachment unit 418 with the second ear cup 415 and thereby define a second axis of rotation 440 of the second ear cup 415 with respect to the second attachment unit 418. The second connection section 430 and the second further connection section 435 comprise a respective further guiding part, arranged to guide the number of connection wires from the second attachment unit 418 to the second ear cup 415.

Due to the respective guiding parts and further guiding parts, the hearing device 400 avoids the exposure of free wires, so that the risk of broken cables or of an entanglement of user's hair is reduced.

The head part 420 of the embodiment illustrated in FIG. 4 is formed by a headband and is configured to have a first end 422 attached to the attachment unit 150 and to have a second end 424 attached to the second attachment unit 418, such that the hearing device 400 is clamped between the ear cup 100 and the second ear cup 415 in case of use.

The headband is formed according to well known headbands known in the art. In particular, the headband comprises a first sliding section 450 and a second sliding section 455 in order to adapt a length of the head part to a form of the head of the user. In an embodiment not shown, the head part is formed by a neckband.

In a further embodiment not shown, the wireless hearing device is a single-ear hearing device, such as a single-ear headset. In a further embodiment not shown, the hearing device is not a headset, as the hearing device 400 shown in FIG. 4, but a headphone or an ear protection device.

Figure 5:
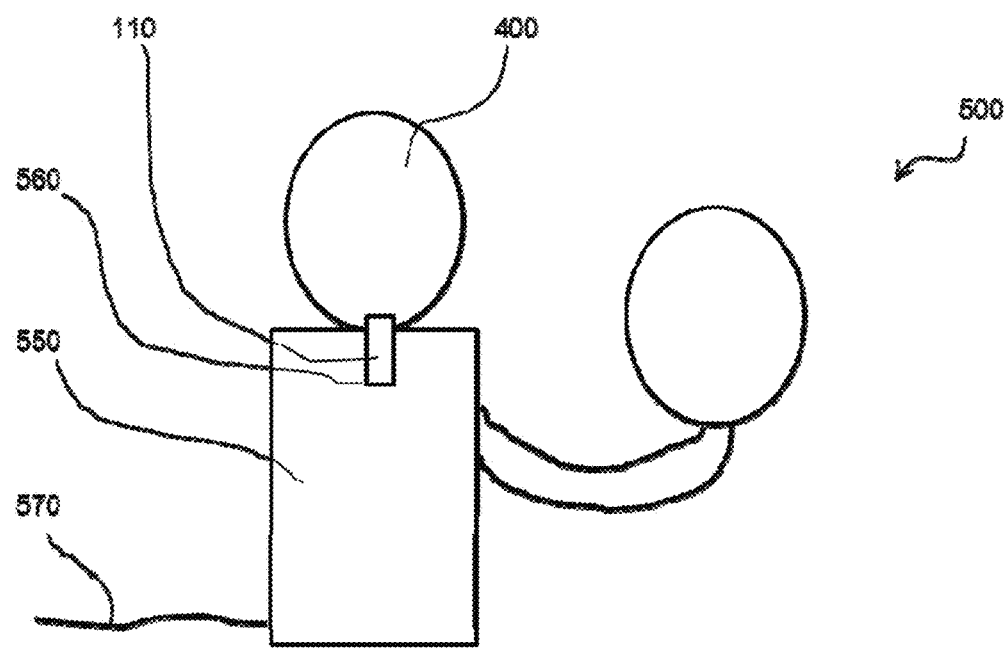
FIG. 5, shows an embodiment of a hearing system according to the third aspect of the invention.

FIG. 5 illustrates an embodiment of a hearing system 500.

The hearing system 500 comprises the hearing device 400 as illustrated in FIG. 4 and a charge station 550, which is configured to charge the hearing device 400 via the charge element 110.

The charge station 550 is formed such that the hearing device 400 can be hung into the charge station 550 by putting the charge element 110 into a respective socket 560 of the charge station 550. In the socket 560, the charge pins 115 of the charge element 110 are in electric contact with a complement part of the socket 560.

The charge station 550 is further configured to receive a line voltage via a power cord 570 and to convert this electric power supply down to a voltage that can be used by the hearing device 400.

In the illustrated embodiment, the hearing device 400 is arranged at the charge station 550 upside down, with the head part 420 of the hearing device 400 facing downwards. In other not shown embodiments of the hearing system, other positions of the hearing device with respect to the charge station are provided, such as sidewards oriented or upwards oriented.

It is intended that the structural features of the devices described above, either in the detailed description and/or in the claims, may be combined with steps of the method, when appropriately substituted by a corresponding process.

As used, the singular forms "a", "an", and "the" are intended to include the plural forms as well (i.e. to have the meaning "at least one"), unless expressly stated otherwise. It will be further understood that the terms "includes", "comprises", "including", and/or "comprising", when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening elements may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more". Unless specifically stated otherwise, the term "some" refers to one or more.

LIST OF REFERENCE SIGNS 100 ear cup
102 side portion
104 hearing portion
106 back portion
107 Inner ring portion
110 charge element
115 charge pins
120 ear cup casing
130 earpad
140 microphone boom
150 attachment unit
160 connection section
165 further connection section
170 axis of rotation
180, 310, 360 opening
190 headband
192, 194, 320, 370 bows
210 lower portion
300 L-type form attachment unit
350 J-type form attachment unit
400 hearing device
410 counterpart
415 second ear cup
418 second attachment unit
420 head part
422 first end
424 second end
430 second connection section
435 second further connection section
440 second axis of rotation
450 first sliding section
455 second sliding section
500 hearing system
550 charge station
560 socket
570 power cord

The invention claimed is:

1. An ear cup with an attachment unit, configured to be used within a head-worn hearing device, wherein the attachment unit comprises
    at least one connection section, which is arranged and configured to rotatable connect the attachment unit with the ear cup by comprising a first part rigidly fixed at the ear cup and a second part rigidly fixed at an attachment body of the attachment unit, wherein the first and the second part are rotatable attached to each other and thereby define an axis of rotation of the ear cup with respect to the attachment unit,
    an opening, which is arranged to allow a charge interface of the ear cup, which extends out of the ear cup, to pass through the opening of the attachment unit, wherein the charge interface protrudes out of an ear cup casing of the ear cup in the direction of the attachment unit and is placed at a side portion of the ear cup, the side portion being placed between a hearing portion of the ear cup, facing to an ear of a user in case of use, and a back portion of the ear cup, facing away from the user in case of use, and wherein the charge interface is electrically connected to an ear cup circuitry within the ear cup, which is configured to operate a speaker unit of the ear cup.

2. The ear cup with the attachment unit according to claim 1, wherein the attachment unit comprises a further connection section, which is arranged and configured to rotatable connect the attachment unit with the ear cup and thereby allows a rotation of the ear cup with respect to the attachment unit along the axis of rotation.

3. The ear cup with the attachment unit according to claim 2, wherein the connection section and/or the further connection section further comprise a guiding part, arranged to guide a number of connection wires from the ear cup to the attachment unit in order to electrically connect the ear cup with a second ear cup via the attachment unit.

4. The ear cup with the attachment unit according to claim 3, wherein the connection wires are enclosed or capsulated by the guiding part.

5. The ear cup with the attachment unit according to claim 1, wherein the ear cup further comprises a rechargeable battery, which is electrically connected to the ear cup circuitry.

6. The ear cup with the attachment unit according to claim 5, wherein the charge interface comprises charge pins or a charge stick configured to be arranged at a charge station in order to charge the rechargeable battery.

7. The ear cup with the attachment unit according to claim 1, wherein the charge interface extends from the side portion of the ear cup in a direction essentially perpendicular to the axis of rotation.

8. The ear cup with the attachment unit according to claim 1, wherein the attachment unit comprises a L-type form, a J-type form or a Y-type form.

9. The ear cup with the attachment unit according to claim 1, wherein the ear cup is oval-shaped, ear-shaped or circular-shaped.

10. A wireless hearing device, configured to be worn by a head of a user, comprising
the ear cup with the attachment unit according to claim 1,
a counterpart, arranged to be attached at a side of the head of the user that is opposed to the ear where the ear cup is worn,
a head part, which is configured to have a first end attached to the attachment unit and to have a second end attached to the counterpart, such that the hearing device is clamped between the ear cup and the counterpart.

11. The wireless hearing device according to claim 10, wherein the counterpart is formed by a second ear cup, and wherein the connection section further comprises a guiding part, arranged to guide a number of connection wires from the ear cup to the attachment unit in order to electrically connect the ear cup with the second ear cup via the attachment unit.

12. The wireless hearing device according to claim 11, wherein the second ear cup is attached to the head part via a second attachment unit, which comprises at least one second connection section, which is arranged and configured to rotatable connect the second attachment unit with the second ear cup by comprising a further first part rigidly fixed at the second ear cup and a further second part rigidly fixed at a second attachment body of the second attachment unit, wherein the further first and the further second part are rotatable attached to each other and thereby define a second axis of rotation of the second ear cup with respect to the second attachment unit.

13. The wireless hearing device according to claim 10, wherein the head part is a headband or a neckband.

14. The wireless hearing device according to claim 10, wherein the hearing device is a headset, a headphone or an ear protection device.

15. A hearing system, comprising the hearing device according to claim 10 and a charge station, which is configured to charge the hearing device via the charge interface.

16. The ear cup with the attachment unit according to claim 2, wherein the connection section and/or the further connection section further comprise a guiding part, arranged to guide a number of connection wires from the ear cup to the attachment unit in order to electrically connect the ear cup with a second ear cup via the attachment unit.

17. The ear cup with the attachment unit according to claim 2, wherein the ear cup further comprises a rechargeable battery, which is electrically connected to the ear cup circuitry.

18. The ear cup with the attachment unit according to claim 3, wherein the ear cup further comprises a rechargeable battery, which is electrically connected to the ear cup circuitry.

19. The ear cup with the attachment unit according to claim 4, wherein the ear cup further comprises a rechargeable battery, which is electrically connected to the ear cup circuitry.

20. The ear cup with the attachment unit according to claim 2, wherein the charge interface extends from the side portion of the ear cup in a direction essentially perpendicular to the axis of rotation.

* * * * *